United States Patent [19]

Stockbridge

[11] Patent Number: 4,739,612

[45] Date of Patent: Apr. 26, 1988

[54] SHUTTLE VALVE FOR OIL TANK FILLER NECK

[75] Inventor: William Stockbridge, Burke, Va.

[73] Assignee: WS Corporation, Madison, Conn.

[21] Appl. No.: 835,477

[22] Filed: Mar. 3, 1986

[51] Int. Cl.⁴ .................... B64D 45/00; B65D 51/00; F02G 3/00

[52] U.S. Cl. .................... 60/39.091; 137/519; 137/538; 220/85 F; 220/85 R; 220/85 V; 244/135 R

[58] Field of Search ............... 137/43, 202, 519, 538; 220/203, 303, 85 F, 85 V, 86 R, 373; 60/39.091; 184/80, 82, 105.1; 244/135 A, 135 R

[56] References Cited

U.S. PATENT DOCUMENTS

| | | | |
|---|---|---|---|
| 1,181,271 | 5/1916 | Villareal | 137/519 |
| 2,209,473 | 7/1940 | Price | 137/519 X |
| 2,528,600 | 11/1950 | Lombard | 137/202 X |
| 3,038,487 | 6/1962 | Gardner . | |
| 3,500,843 | 3/1970 | White | 137/43 |
| 3,513,875 | 5/1970 | Nelson . | |
| 4,059,124 | 11/1977 | Hill | 137/519 X |
| 4,142,549 | 3/1979 | Autry | 137/538 X |
| 4,187,871 | 2/1980 | Hendrickson . | |
| 4,275,759 | 6/1981 | Huang . | |
| 4,312,649 | 1/1982 | Fujii et al. . | |
| 4,349,044 | 9/1982 | Schirmer . | |
| 4,366,669 | 1/1983 | Jones | 60/39.091 |

Primary Examiner—Robert G. Nilson
Attorney, Agent, or Firm—Martha G. Pugh

[57] ABSTRACT

The invention relates to a shuttle valve designed to retain fluid in a pressurized system when the cap or closure of the filler neck is damaged or left off. In a preferred application, the shuttle valve of the present invention is designed to be installed in the filler neck of an oil storage tank incorporated in a turbine engine of an airplane or other high speed vehicle. The valve head comprises a piston which is disposed to move slideably and is biased by gravity, or other means, to seat in normally closed position near the inner end of a cylindrical sleeve which is suspended coaxially from an annular flange in the mouth of the filler neck. The cylindrical sleeve has an axial length which substantially exceeds that of the piston, which in one embodiment is a hollow cylinder closed at one end. The outer side wall of the sleeve has a plurality of openings spaced-apart around its circumference, which are exposed when the valve head piston is seated at the base of the sleeve in its normally open position, and which are closed when the piston is forced toward the outer end of the sleeve in response to a pressure differential created by the breather pressure of the operating engine.

8 Claims, 3 Drawing Sheets

SHUTTLE VALVE FOR OIL TANK FILLER NECK

BACKGROUND OF THE INVENTION

This relates in general to valves designed to retain fluid in a pressurized system, and more particularly to shuttle valves designed for the filler neck of a turbine engine oil storage tank installed in an airplane or other high speed vehicle.

Engine oil tank caps are occasionally left off or improperly secured subsequent to routine oil servicing of turbine engines in airplanes. Normal engine oil breather pressure is sufficient to cause complete loss of tank oil during take-off, resulting in in-flight shut down and fuel dumping, leading to air turnback, emergency procedures and lengthy delays.

It is therefore the principal object of this invention to improve the safety of pressurized systems, more particularly of airplanes and other high speed vehicles equipped with turbine engines by compensating for the loss or removal of oil tank caps associated with the lubricating systems of the engines.

SHORT DESCRIPTION OF THE INVENTION

These and other objects of the invention are achieved by the use of a shuttle valve installed in the filler neck of an oil storage tank in a pressurized system, more particularly, in a turbine engine of an airplane or other high speed vehicle.

The valve comprises a cylindrical piston closed at one end which is disposed to move slideably in an axial direction in a cylindrical sleeve which is suspended from an annular flange in the filler neck of the turbine engine oil tank. The cylindrical sleeve, which has an axial length about twice that of the piston, is provided with an inwardly-directed annular seat at its lower end against which the inner edge of the piston rests under the pull of gravity, in the normally open condition of the valve. In preferred embodiment the piston is a hollow cylinder closed at the other end. In some embodiments, depending on the orientation of the piston and the enclosing sleeve, a spring-bias may be used to supplement the gravity bias relied on in the preferred embodiment to return the piston to its rest position when the pressure differential is reduced or eliminated.

The filler openings in the side wall of the sleeve comprise a series of large round openings, say, from four to eight, symmetrically spaced around the circumference of the sleeve, and positioned above the closed end of the sleeve so that they are exposed when the valve piston is in its rest, normally- open position in response to a zero or nominal pressure differential. Oil is added through the top of the valve and enters the tank through these filler openings in the sleeve. The tank is serviced to full capacity when no more oil can be added without overflow. When the engine is started, breather pressure is generated within the oil system, creating a pressure differential between the oil tank interior and the atmosphere, forcing the piston to slide axially within the sleeve, closing and sealing shut the oil inlet openings. A valve nut holds the valve sleeve in place against a laterally-directed annular flange on the inner surface of the filler neck. Packing comprising an annular elastomer ring is interposed between the outer surface of the nut and the inner surface of the filler neck to prevent oil loss. Also, the valve piston incorporates packing near its upper end comprising an annular elastomer ring which mates with a frustoconical annular seat on the inner periphery of the valve nut. This packing forms a seal that prevents oil from escaping back out through the filler opening. Whenever the pressure differential between the atmosphere and the interior of the oil tank is reduced substantially to zero, the piston slides back to its normally open, rest position responsive to the force of gravity, or alternatively, to spring bias.

It is contemplated that the shuttle valve of the present invention will be mounted in and operated in any turbine engine oil tank that will generate a sufficient amount of pressure to force oil from the storage tank during the engine operation.

The particular feature of the present invention is that even though the cap is left off of the filler neck of the oil tank through inadvertance or carelessness during servicing of the turbine engine, the breather pressure developed by the operating engine will cause a pressure differential in the oil system which forces the shuttle valve of the present invention to move into its closed position, preventing oil loss during all engine operating modes, avoiding in-flight shut down, and possibly disastrous effects.

In a similar manner, the shuttle valve of the present invention is applicable to the oil systems of high speed racing vehicles.

These and other objects, features and advantages of the present invention will be apparent upon a study of the specification hereinafter with reference to the attached drawings.

SHORT DESCRIPTION OF THE DRAWINGS

DETAILED DESCRIPTION OF THE INVENTION

Figure 1A:
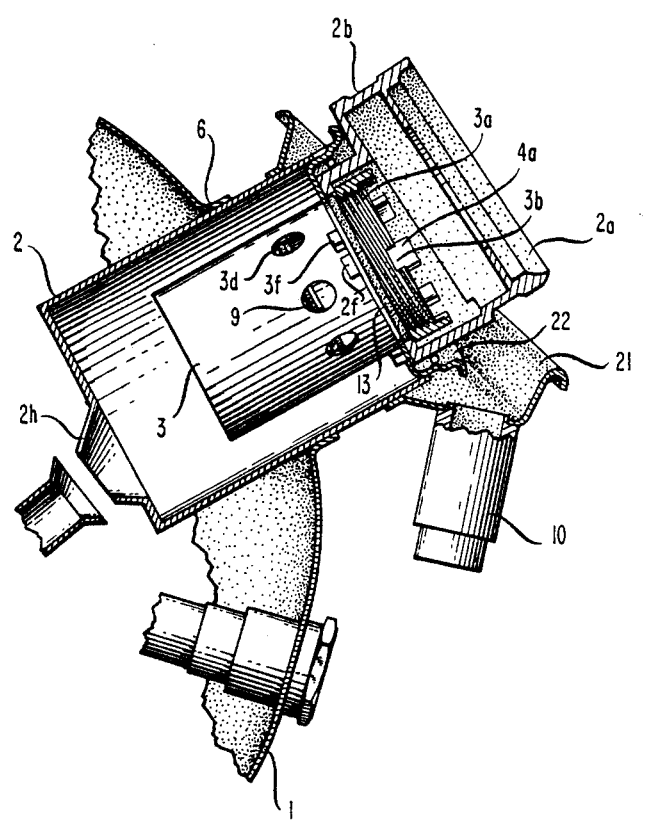
FIG. 1A is an overall showing of the shuttle valve of the present invention installed in the filler neck of a turbine engine oil tank.
Figure 1B:
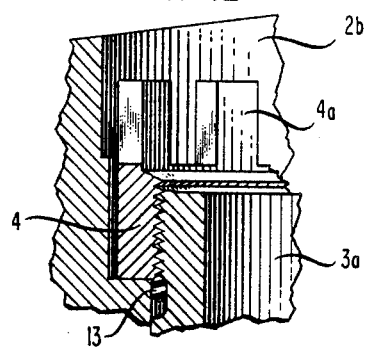
FIG. 1B is a detail of one section of FIG. 1A showing the stacking nut interposed between the valve sleeve and the oil tank filler neck for securing the valve sleeve.

Referring to FIG. 1A of the drawings, a fragment of an oil tank 1 associated with an airplane turbine engine is shown, in which the shuttle valve of the present invention is mounted in the conventional filler neck extension 2b. The latter rests in the filler neck lining 22 fitted into the upper end of filler neck 2, which is welded or otherwise secured to the interior of a flanged opening 6 in the oil tank 1. The filler neck 2 is surrounded at its upper end by an oil scupper 21 which is placed over the outer periphery of 2. The oil scupper serves to take up spillage.

Figure 4:
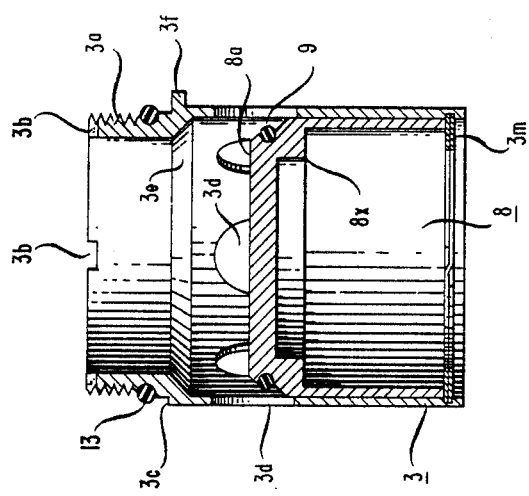
FIG. 4 is a diametrical section through FIG. 2 showing the piston in normally open rest position in the valve sleeve.
Figure 2:
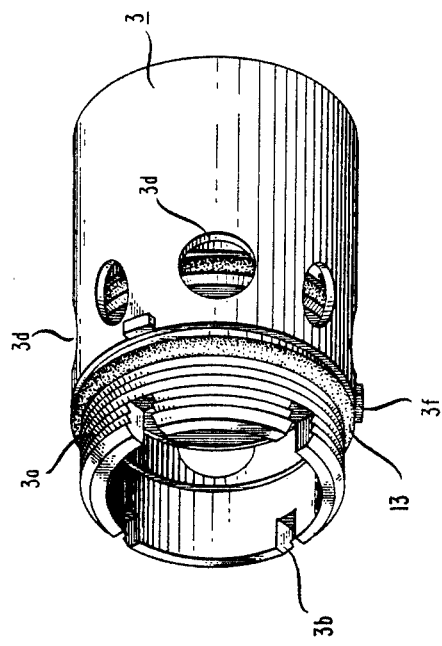
FIG. 2 is a perspective showing of the shuttle valve of the present invention assembled, in normally open rest position.

Referring to FIGS. 2 and 4, in accordance with one embodiment, the shuttle valve of the present invention comprises a cylindrical valve sleeve 3 of 304L seamless pipe, having a two inch outer diameter, a nominal wall thickness of 0.065 inch, and a length along the axis of 1.750 inch, not including the screw-threaded collar 3a. The inner diameter of the sleeve 3 machined to a dimension of between 1.872 and 1.876 inch. Prior to use, the inner surface of the cylindrical sleeve 3 is preferably finished in a vibratory mill to a surface roughness not exceeding about 32AA micro inch.

In this embodiment, eight filler holes 3d are drilled through the sidewall of the sleeve 3. The holes 3d are symmetrically spaced around the circumference, each having a diameter of ½ inch, and centered around a plane 1.375 inch from the inner end of the sleeve. Set back 0.075 inch from the inner end of the sleeve 3 is a 360 degree recess which is machined on the inner surface of the sleeve, having a depth of 0.035 inch from the inner surface, and having a width of 0.0615 inch. This accommodates an inwardly projecting annular retaining ring 3m about 1/16 inch wide and 1/16 inch thick.

The cylindrical sleeve 3 is fitted at its outer end, or integrally formed, as in the presently described embodiment, with the collar 3a. The latter has an inner diameter, which varies between 1.550 and 1.57 inches, having an axial extent of 9/16 inch, being internally chamfered at an angle of approximately 45 degrees to form an internal annular beveled shoulder 3e between the larger internal diameter of sleeve 3 and the smaller internal diameter of collar 3a. The collar 3aa is similar in structure and dimension to Pratt and Whitney nut P/N 497495. Although in the presently described embodiment the collar 3a is formed integrally with the sleeve 3, it will be understood that it can take the form of Pratt and Whitney nut P/N 497495, or similar nut, which is welded or otherwise secured to the outer end of the cylindrical sleeve 3. In the present ewmbodiment the collar 3a has an overall outer diameter of 1 13/16 inch and is peripherally screw-threaded to an axial depth of 5/16 inch, being machined with a 360 degree recess at the lower end of the screw threads, which has a depth of, say, 0.035 from the outside periphery, and has a width of, say, 0.065 inch. Interposed in this groove is a packing ring 13 which may, for example, take the form of code-marked ring P/NM9388-130, manufactured by Pratt and Whitney, or a similar type ring. At the base of the collar 3a just below the recess is disposed a laterally-extending ring shaped flange 3c, extending 360 degrees, forming a shoulder which projects out 1/16 inch from the periphery of the screw-threaded collar 3a. Extending out, say ⅛ inch laterally from the periphery of the flange 3c are three symetrically spaced tabs 3f, each, say, ⅜ inch wide and ⅛ inch thick.

Figure 3:
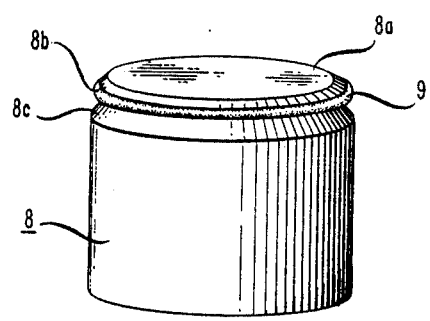
FIG. 3 is a perspective showing of the valve piston removed from the sleeve.
Figure 5:
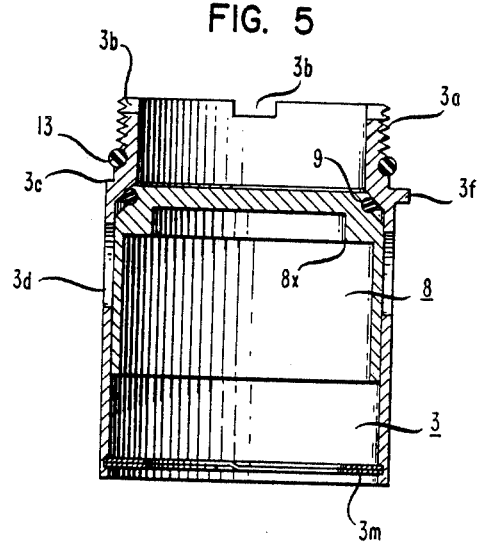
FIG. 5 is a diametrical section similar to FIG. 4, except that the piston has moved to closed position, closing the oil filler openings.

Referring again to FIGS. 2, 3 and 4, the piston 8 comprises a hollow cylinder of light-weight metal such as AMS 4117 aluminum, which may, for example, have an overall, outside diameter of, say, 1.86 inches. The embodiment under description has an overall axial length of 1.375 inch. The piston 8 has a uniform outer diameter to within 0.3 inch from the closed outer face 8a, which is stepped back to a diameter of, say, 1.44 inches, the annular edge 8c being beveled at an angle of, say, 45 degrees. An annular recess 8b, having a rectangular cross-section, say, 0.286 inch deep, is machined into the annular edge 8c, being centered on a plane parallel to and spaced, say, 0.144 inch from the outer face 8a, so as to provide an annular overhang Arca or cap of the piston 8.

The wall thickness of the piston 8 in the presently-described embodiment is, say, 0.07 inch, giving it a uniform internal diameter of 0.846 inch from the inner end to a plane, say, 0.03 from the outer end 8a, where the diameter is reduced to, say, 1.32 inch, forming an internal annular shoulder 8x. The annular recess comprising packing groove 8b is machined in a vibratory mill. The piston 8 is alodined in accordance with standard practice, after polishing.

The packing ring 9, which seats in groove 8b and surrounds the periphery at the forward end of piston 8, may, for example, be an elastomer ring of a preferred material such as known by the trademark VITON747, and may take the form, for example, of a ring known by the code number P/MS9388-221 or MS9388-220, manufactured by Pratt and Whitney, or a similar type ring. The piston 8 is is inserted into the cylindrical sleeve 3, with the closed end pointed toward the ouside, and retained by a retaining ring similar to Pratt and Whitney code numbered ring P/N640018, or alternatively, a circular clip.

FIG. 1A shows how the shuttle valve of the present invention is installed in the filler neck 2 of the oil storage tank. It is important that the valve of the present invention is installed in the filler neck 2 so that in the tank-filling position, with the plane at rest on the ground, the piston 8 will remain in and return to its rest position by the force of gravity unless responding to a pressure differential in the filler neck. Otherwise, a spring-bias mechanism would be required to return the piston to its rest position.

Pratt and Whitney oil tank extended filler neck 2b code numbered P/N697492, or a device of similar description, is installed over the threaded collar 3a, so that the latter projects outwardly. A cassalated nut 4, such as Pratt and Whitney nut code numbered P/N697493, or a similarly constructed nut, is mated to the threads on collar 3a, and tightened against gasket 13 which is seated at the base of threaded collar 3a, so as to firmly secure the shuttle valve assembly to the oil storage tank filler neck extension 2b. The latter is seated in filler neck lining 22. The oil tank filler neck extension 2b has a plurality of lugs 2f (three in the present embodiment) which are, say, ½ inch thick, and extend downward, say, ¼ inch at symmetrically spaced positions around the periphery of the filler neck extension 2b so that when cassalated nut 4 is tightened against gasket 13 the lugs 3f are positioned against lugs 2f to secure the shuttle valve against rotation in filler neck extension 2b. Additional packing may be inserted between the nut 4 and the inner periphery of the filler neck extension 2b, and staking may be required to secure the screwed connection. See FIG. 1A which is an enlarged showing of the area between nut 4 and filler neck extension 2b.

Operation

With the shuttle valve of the present invention installed in the oil storage tank filler neck extension 2b, oil will be retained in the tank even though the cap is missing or removed. The piston 8 in the cylindrical sleeve 3 is normally in the open position, resting against the retaining ring 3m on the inside periphery of the cylindrical sleeve 3. Oil added to the storage tank through the filler neck extension 2b enters the tank through the holes 3a drilled in the cylindrical sleeve 3 of the valve, until the oil overflows. When the engine is started, normal oil system pressure or breather pressure is generated which is sufficient to force the piston 8 in the shuttle valve to move slideably upward closing the holes 3b before the engine is at normal idle speed. If the oil cap is damaged or missing, the two packings, ring 13 on the valve nut that seals between the collar 3a and the oil tank filler neck extension 2b, and ring 9 on the piston 8 that seals between the piston on conical seat 8a and the inner periphery of the shoulder 3c of collar 3a, form tight seals to prevent any oil escaping from the storage tank. With the cap installed properly on filler neck extension 2b and not damaged, the piston 8 will remain in the open position against the retaining ring 9 due to a zero differential pressure. The present embodiment is designed so that the valve will close whenever a pressure differential of between 0.25 and 1.5 pounds per square inch is generated. The piston 8 will remain in the closed position until the pressure differential drops to substantially zero or some other preselected low value.

It will be understood that the present invention is not limited to the structure or components of the specific example shown herein by way of example. For example, although eight openings 3d are disclosed in the sleeve 3, it will be understood that the number of openings is variable, and that the valve will operate satisfactorily with four openings. Furthermore, although the piston 8 is hollow in the presently disclosed embodiment, it will be understood that under certain circumstances, if light enough material is used, it could be solid.

The scope of the invention is limited only by the appended claims.

What is claimed is:

1. A shuttle valve designed to retain fluid in a vapor pressurized system having a fluid filler neck leading to a tank in which the cap is missing, which valve comprises in combination:
    a cylindrical piston;
    a valve sleeve constructed to be mounted coaxially in said filler neck and having one or more filler openings in the cylindrical side wall which lead into said tank;
    said piston disposed to move slideably in an axial direction in said valve sleeve, and constructed to seat exclusively in response to gravitational force in a first normally-open rest position in which said filler openings in said sleeve are exposed, and to move in an axial direction in said sleeve in response to a preselected vapor pressure differential generated in said system, which overcomes said gravitational force, to a second position in which said filler openings are closed, and to move back to said first normally open position in response to said gravitational force when said vapor pressure differential is removed or substantially reduced below said preselected vapor pressure differential.

2. A shuttle valve in accordance with claim 1 wherein said vapor pressurized system comprises an oil storage tank for a turbine engine incorporated in an airplane or other high speed vehicle, wherein said preselected vapor pressure differential is due to the oil breather pressure generated in said system by operation of said turbine engine.

3. In a system comprising an oil storage tank incorporated in a turbine engine which, upon operation, generates a substantial oil breather pressure producing a preselected pressure differential in the system comprising said oil storage tank, said oil storage tank having a filler neck, which, in normal rest position of said system is disposed with its upper end protruding in a direction opposing the force of gravity;
    a shuttle valve comprising a cylindrical sleeve disposed in said storage tank filler neck in coaxial relation thereto, said shuttle valve having at least one filler opening in its cylindrical side wall which communicates with said oil storage tank;
    a piston disposed to move, in response to said preselected pressure differential in said system, in slideable relation in an axial direction in said sleeve from a first normally-open rest position at the lower end of said sleeve in which the openings in said sleeve are at least partially exposed in communicating relation with said oil storage tank, to a second closed position in which said openings are sealed closed, and to return to said normally-open rest position exclusively in response to the force of gravity when said pressure differential is removed or substantially reduced.

4. The combination in accordance with claim 3 wherein said piston comprises a hollow cylinder closed at one end.

5. The combination in accordance with claim 4 wherein said hollow cylindrical piston consists essentially of aluminum, and has a wall thickness not exceeding about 0.07 inch.

6. The combination in accordance with claim 3 wherein said filler openings comprise a plurality of openings symmetrically spaced around the circumference of said sleeve with the edges of said openings tangential to or above a plane coinciding with the upper end of said piston in normally-open rest position.

7. The combination in accordance with claim 3 wherein said filler neck comprises at its upper end an inwardly-directed frustoconical annular lip having a first set of lugs spaced-apart around its inner periphery and directed downwardly from the inner surface of said lip;
    said valve sleeve terminating at its upper end in an externally screw-threaded collar surrounded by an annular flange from which protrudes a second set of lugs which are constructed to be engaged by and secured against said first set of lugs;
    a torque nut which is constructed to screw onto said screw-threaded collar engaging said lip for securing said sleeve in coaxially depending relation in said filler neck; and packing means comprising one or more annular rings of elastomeric material interposed between the closed end of said piston and the inner surface of said sleeve, and between said collar and the inner surface of said filler neck.

8. A shuttle valve designed to retain fluid in a vapor pressurized system having a fluid filler neck leading to a tank in which the cap is missing, which valve comprises in combination:
    a piston comprising a hollow cylinder closed at one end consisting essentially of aluminum and having a wall thickness not exceeding about 0.07 inch;
    a valve sleeve constructed to be mounted coaxially in said filler neck and having one or more filler openings in the cylindrical side wall which are constructed to lead into said tank;
    said piston disposed to move slideably in an axial direction in said valve sleeve with its closed end up, and constructed to seat with its open end down exclusively in response to gravitational force in a first normally-open rest position in which said one or more filler openings in said sleve are at least partially exposed, and to move in an axial direction in said sleeve in response to a preselected vapor pressure differential generated in said system, which overcomes said gravitational force, to a second position in which said filler openings are closed, and to move back to said first normally-open rest position in response to said gravitational force when said vapor pressure differential is removed or substantially reduced below said preselected vapor pressure differential.

* * * * *